United States Patent
Suzuki et al.

(10) Patent No.: US 7,051,216 B2
(45) Date of Patent: May 23, 2006

(54) DISK ARRAY DEVICE AND METHOD OF SUPPLYING POWER TO DISK ARRAY DEVICE

(75) Inventors: Hiroshi Suzuki, Kanagawa (JP);
Hiromi Matsushige, Kanagawa (JP);
Masato Ogawa, Kanagawa (JP);
Tomokazu Yokoyama, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 10/463,723

(22) Filed: Jun. 16, 2003

(65) Prior Publication Data

US 2004/0068670 A1 Apr. 8, 2004

(30) Foreign Application Priority Data

Oct. 3, 2002 (JP) .............................. 2002-290739

(51) Int. Cl.
G06F 1/26 (2006.01)
(52) U.S. Cl. .................... 713/300; 713/340; 714/42
(58) Field of Classification Search ................ 713/300, 713/330, 340; 714/14, 22; 363/15
See application file for complete search history.

(56) References Cited

U.S. PATENT DOCUMENTS

| | | | |
|---|---|---|---|
| 5,325,363 A | 6/1994 | Lui | |
| 5,675,816 A | 10/1997 | Hiyoshi et al. | |
| 5,768,117 A | 6/1998 | Takahashi et al. | |
| 5,784,641 A | 7/1998 | Sueyoshi et al. | |
| 5,790,374 A | 8/1998 | Wong | |
| 5,832,281 A | 11/1998 | Maeda | |
| 5,842,030 A | 11/1998 | Larabell et al. | |
| 5,886,424 A | 3/1999 | Kim | |
| 5,915,122 A | 6/1999 | Tsurumi | |
| 6,012,124 A | 1/2000 | Kamo et al. | |
| 6,029,199 A | 2/2000 | Allen et al. | |
| 6,094,725 A | 7/2000 | Hiyoshi et al. | |
| 6,231,224 B1 | 5/2001 | Gamble et al. | |
| 6,272,573 B1 | 8/2001 | Coale et al. | |

(Continued)

FOREIGN PATENT DOCUMENTS

WO WO 93/23805 11/1993

OTHER PUBLICATIONS

"Transistor Gijutsu Special No. 28," 2d Ed., CQ Publishing Co., Ltd. (Jan. 20, 1993), p. 4, Figures 4-6, and p. 7, Figure 1. (Note: The figures in this article show typical configurations of switching regulators, which merely constitue a background of the present invention).

*Primary Examiner*—Thuan Du
(74) *Attorney, Agent, or Firm*—Townsend and Townsend and Crew LLP

(57) ABSTRACT

A disk array device and a method of supplying power to a disk array device to which power is supplied by at least two AC inputs are provided. Where at least two AC/DC power-supply groups are provided in correspondence with each of the AC inputs and each AC/DC power-supply group includes at least two AC/DC power supplies that are connected to the AC input corresponding to that group, outputs from the AC/DC power supplies are summed separately for each group to obtain group total outputs for each group, and the group total outputs are input to each of a plurality of loads in the disk array device to provide power to each of the loads.

16 Claims, 8 Drawing Sheets

U.S. PATENT DOCUMENTS

| | | |
|---|---|---|
| 6,311,279 B1 | 10/2001 | Nguyen |
| 6,317,839 B1 | 11/2001 | Wells |
| 6,389,546 B1 | 5/2002 | Kano et al. |
| 6,408,400 B1 | 6/2002 | Taketa et al. |
| 6,510,050 B1 | 1/2003 | Lee et al. |
| 6,604,199 B1 | 8/2003 | Yang et al. |
| 6,694,438 B1 | 2/2004 | Porter et al. |
| 6,742,068 B1 | 5/2004 | Gallagher et al. |
| 6,757,835 B1 | 6/2004 | Kano et al. |
| 6,795,322 B1 | 9/2004 | Aihara et al. |
| 2002/0032875 A1 | 3/2002 | Kashani |
| 2002/0053037 A1 | 5/2002 | Lee |
| 2002/0196601 A1 | 12/2002 | Lee et al. |
| 2003/0041278 A1 | 2/2003 | Lin |
| 2003/0105982 A1 | 6/2003 | Suzuki |
| 2003/0177404 A1 | 9/2003 | Jorgenson et al. |
| 2003/0188206 A1 | 10/2003 | Odaohhara |
| 2003/0200472 A1 | 10/2003 | Midorikawa et al. |
| 2003/0217300 A1 | 11/2003 | Fukumori et al. |
| 2004/0003306 A1 | 1/2004 | Oomori |
| 2004/0036995 A1 | 2/2004 | Suzuki et al. |
| 2004/0068670 A1 | 4/2004 | Suzuki et al. |
| 2004/0078663 A1 | 4/2004 | Inaba |
| 2004/0088589 A1 | 5/2004 | Westerlnen et al. |
| 2004/0111560 A1 | 6/2004 | Takase et al. |
| 2004/0143688 A1 | 7/2004 | Sugimoto |
| 2004/0181699 A1 | 9/2004 | Katoh et al. |
| 2004/0193791 A1 | 9/2004 | Felton et al. |
| 2004/0199353 A1 | 10/2004 | Bingham et al. |
| 2004/0255174 A1 | 12/2004 | Chen et al. |
| 2005/0081068 A1 | 4/2005 | Sakakibara et al. |

* The section indicated by the broken line may be deemed as one HDU housing, and a plurality of those HDU housings can be installed in the DKU.

→ data transfer path
→ failure report path

DISK ARRAY DEVICE AND METHOD OF SUPPLYING POWER TO DISK ARRAY DEVICE

CROSS-REFERENCE TO RELATED APPLICATIONS

The present application claims priority upon Japanese Patent Application No. 2002-290739 filed Oct. 3, 2002, which is herein incorporated by reference.

BACKGROUND OF THE INVENTION

1. Field of the Invention

The present invention relates to a disk array device and a method of supplying power to a disk array device.

2. Background Art

An apparatus is known in which its storage capacity can be increased by adding devices mounted with disk drives (hereinafter referred to as HDDs). An example of such an apparatus may be a so-called rackmount-type disk array device (or storage device). To the apparatus' rackmount or each of the apparatus' housings are mounted HDD housings. Such an HDD housing may comprise one basic housing as well as other additional housings added as needed. As shown in FIG. 14, each housing contains a plurality of HDDs, an array controller for providing HDD control (hereinafter referred to simply as a "controller"), and various peripheral circuits such as an AC/DC power supply. Such a storage device is disclosed in Japanese Publication No. JP-7-508112-T of International Application No. PCT/US93/04444.

The AC/DC power supply receives AC power (AC input) from the outside, converts it into a direct current (DC), and supplies power to all HDDs and peripheral circuits in the housing. An AC/DC conversion circuit may be mounted on a power supply circuit board in a power supply housing as the AC/DC power supply.

Each AC power inputs (AC input 1 and AC input 2) has its own AC/DC power supply, establishing a duplex AC/DC power supply system. The DC output of each AC/DC power supply is supplied via a power supply line on a motherboard to all HDDs and peripheral circuits, such as an interface control circuit for controlling the interface with the controller.

A backup battery section is also furnished as an uninterruptible power supply (UPS) to provide for any power supply failure. The battery section may be, for example, a secondary battery that stores electrical power and permits discharge. The DC output of the battery section is coupled, by means of ORing, to the DC outputs of the AC/DC power supplies via power supply lines on the motherboard. While a normal operation is being conducted with no power supply failure encountered, the battery section becomes fully charged by the AC/DC power supplies and remains on standby. If a power supply failure occurs, the battery section is discharged to supply power in place of the AC/DC power supplies.

To provide scalability so as to handle mounted HDDs that tend to increase in number, the above disk array devices make it possible to increase the number of HDDs mounted within a housing. In line with the provision of such scalability, it is also demanded that the power supply system be improved.

Various troubles caused by a power supply failure will now be described. If a power supply line is shorted to ground on the motherboard, all the HDDs and the interface control circuit mounted within a housing become inoperative due to the resulting voltage drop. In other words, the entire contents of the housing are adversely affected by the power supply failure. In addition, the power supply failure also adversely affects an interface control circuit that is mounted within another housing and connected to the interface control circuit that has failed. As the influence of the power supply failure is enlarged in this manner, an enormous amount of time and labor will be required to achieve recovery.

If a power supply failure occurs on the motherboard, all the HDDs mounted on the motherboard are rendered inaccessible. As a result, the data stored according to RAID (Redundant Array of Inexpensive Disks) is partly lost. After the motherboard is recovered, it is therefore necessary to recover the lost data from the remaining data and write it back to a HDD that has been recovered. The time required for such a write operation increases with an increase in the HDD storage capacity. If another failure occurs in another HDD or the motherboard before the lengthy recovery procedure is completed, data recovery will no longer be achievable. To minimize the possibility of the occurrence of this situation, it is necessary to use high-reliability, expensive parts with a view toward decreasing the failure rate of HDDS, motherboard, and other relevant components.

Even if a power supply failure occurs in a HDD, controller, or other component on the motherboard, it affects the motherboard and lowers the supply voltage. As a result, all the HDDs mounted on the motherboard become inoperative.

A problem caused by an increase in the number of HDDs on a motherboard will now be described. When the mounted HDDs increase in number, their load current increases. Voltage noise then increases due to the fluctuation of the increased load current. As a result, voltage stability cannot be maintained.

Further, the increase in number of HDDs may cause a voltage drop due to power supply failure or noise increase within a conductive pattern on the motherboard, which supplies power to the HDDS. To avoid such a trouble, it is necessary to ensure that the conductive pattern thickness and width are adequate. However, this requires the motherboard to be increased in the number of conductive pattern layers. As a result, the motherboard thickness increases, thereby raising the motherboard price.

A problem caused by HDD hot-plugging/hot-unplugging will now be described. If a HDD is hot-plugged to a live power supply line on the motherboard, an inrush current to the HDD arises. The power supply line voltage becomes unstable due to the inrush current so that the stability of the voltage supply to the activated HDD cannot be maintained. To avoid this trouble, it is necessary to add a new circuit for inhibiting the inrush current that may arise upon HDD hot-plugging.

The balance between two AC inputs for a duplex AC power supply will now be described. If the power consumption varies in accordance with the operation states of the installed HDDs, unbalance results because the two AC inputs cannot be equally divided.

A power supply failure that may occur during destaging will now be described. If the AC input to disk array devices is lost due, for instance, to a power failure, the battery section will supply power so that the data stored in the controller's cache can be written into each HDD. However, the battery section must supply power to all HDDs and cannot limit the power supply destination to a HDD that is about to store data. More specifically, power supply control cannot be exercised on an individual HDD basis so that, until destaging is finished, the battery section is forced to supply power to all HDDs including the ones that do not have to operate. As a result, the capacity of the battery section needs to be increased. Such a capacity increase causes an increase in size, weight, and price.

Meanwhile, an FET, relay, or other switching device can be mounted in the power supply path to each HDD to enable the battery section to selectively supply power to a specific HDD. Such a switching device can be turned OFF to shut off the power supply to a HDD that does not have to operate. The use of this method makes it possible to minimize the power consumption and avoid increase in the capacity of the battery section. However, while a normal operation is conducted with no failure encountered, that is, while the HDDs receive power supply from an AC power supply and operate normally, a voltage drop or noise generation may occur due to the on-resistance of an FET or other switching devices in the power supply path. Therefore, a switching device should not be mounted in the power supply path leading to each HDD.

No matter what the HDD storage capacity is, it is also necessary to furnish an AC power supply and battery section that are capable of supplying power adequate for the maximum number of HDDs that can be mounted within a housing. Therefore, if an unexpectedly small number of HDDs are mounted, not only does the power efficiency deteriorate, but also the size and price of a disk array device increase due to the use of an unnecessarily large AC power supply and battery section.

SUMMARY OF THE INVENTION

It is therefore an object of the present invention to enhance the reliability of a disk array device.

According to one aspect of the present invention, a disk array device and method of supplying power to a disk array device are provided.

In a disk array device to which power is supplied by at least two AC inputs or in a method of supplying power to such a disk array device, where at least two AC/DC power-supply groups are provided in correspondence with each of the AC inputs and each AC/DC power-supply group includes at least two AC/DC power supplies that are connected to the AC input corresponding to that group, outputs from the AC/DC power supplies are summed separately for each group to obtain group total outputs for each group, and the group total outputs are input to each of a plurality of loads in the disk array device to provide power to each of the loads.

Features and objects of the present invention other than the above will become clear by reading the description of the present specification with reference to the accompanying drawings.

BRIEF DESCRIPTION OF THE DRAWINGS

For more complete understanding of the present invention and the advantages thereof, reference is now made to the following description taken in conjunction with the accompanying drawings wherein.

DETAILED DESCRIPTION OF THE INVENTION

Brief Outline of the Invention

Figure 1:
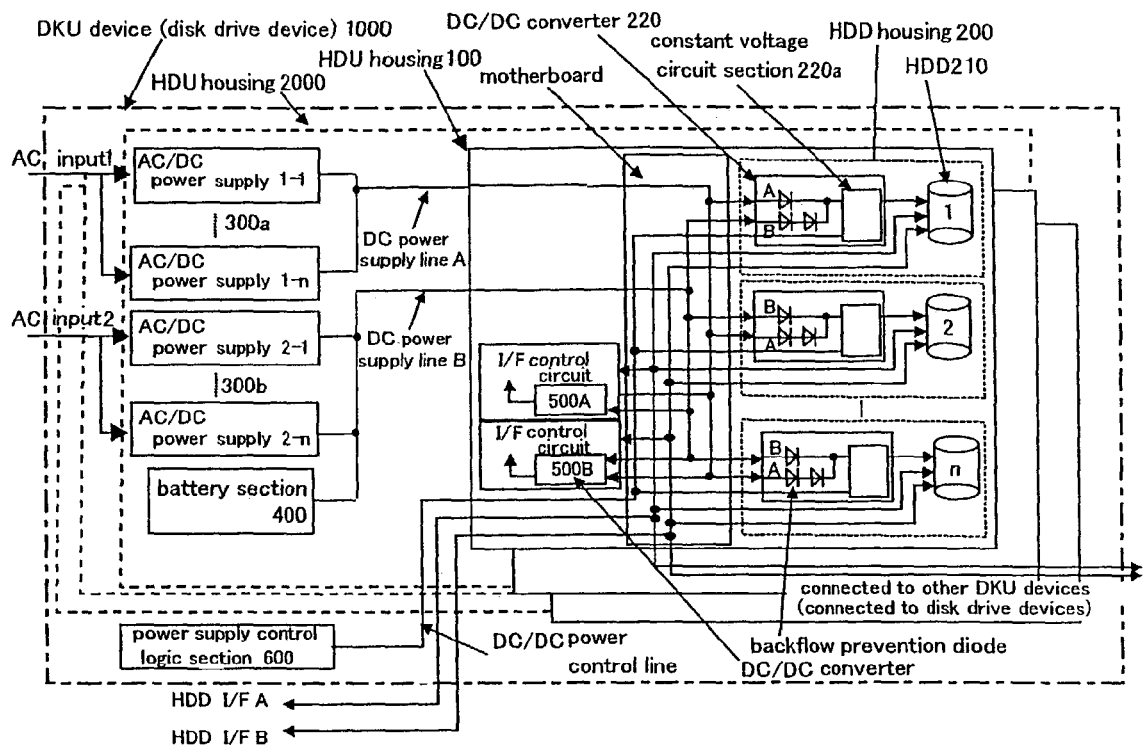
FIG. 1 is a block diagram illustrating one embodiment of the present invention.

At least the following features and advantages of the present invention will become more fully understood from the detailed description and from the accompanying drawings.

Each of the loads may be provided with a regulated DC power supply for generating a supply voltage from the group total outputs.

The regulated DC power supply may be a DC-DC converter.

The load may be a disk drive, and a housing containing the disk drive may include the regulated DC power supply.

The output voltage of the AC/DC power supply may be higher than an output voltage of the regulated DC power supply.

Each of the group total outputs may be made of a first group total output and a second group total output; each DC stabilized power supply of each of the loads may have a first backflow prevention device having a first turn-on voltage and a second backflow prevention device having a second turn-on voltage that is higher than the first turn-on voltage; one end of the first backflow prevention device and one end of the second backflow prevention device in each DC stabilized power supply may be connected to each other, and a number of DC stabilized power supplies in which another end of the first backflow prevention device is connected to the first group total output and a number of DC stabilized power supplies in which another end of the first backflow prevention device is connected to the second group total output may substantially be the same.

The number of DC stabilized power supplies being the same means that the same number or approximately the same number of regulated DC power supplies exist while the above-mentioned first and second group total outputs to be supplied to the regulated DC power supplies are equally distributed. Equal distribution means that the AC input that is the power source for the first group total output and the AC input that is a power source for the second group total output are equally distributed.

The regulated DC power supply may output the supply voltage to the loads in accordance with a control signal that is input to the regulated DC power supply.

A power supply control circuit for generating a control signal may be provided, wherein, when a write process is performed to write data stored in a memory onto the disk drive in response to a write instruction received from an external host device, the power supply control circuit outputs a control signal to stop the, operation of the regulated DC power supply that is provided for outputting the supply voltage to the disk drive for which the write process has been finished.

According to another aspect of the present invention, a disk array device to which power is supplied by an AC input, comprises: at least two AC/DC power supplies that are connected to the AC input, wherein outputs of each of the AC/DC power supplies are connected to provide a total output; and a battery section to which the total output is provided as an input thereof, wherein the total output and an output of the battery section are input to each of a plurality of loads in the disk array device to provide power to each of the loads.

A method of supplying power to a disk array device to which power is supplied by an AC input is also provided.

EMBODIMENTS

One embodiment of a disk array device, which permits an increase/decrease in the storage capacity and incorporates HDDs, will now be described. When a rackmount-type is used as an example of a device in which HDDs are mounted, a plurality of longitudinal mount frames are formed on the right- and left-hand inner surfaces of a rack frame and arranged in the vertical direction. A drawer-type basic housing and additional housings are mounted along the mount frames. The present invention is also applicable to various devices in which HDDs are mounted, even if they are not of the rackmount-type. It should be noted that the "disk array device" may be the DKU device (disk drive device) 1000, the HDU housing 2000, or the disk subsystem, which are shown in the drawings.

As shown in the block diagram of FIG. 1, the housings (HDD housings) 100 contain various boards and units. These boards and units are mounted on a motherboard and offer various functions of the disk array device. A plurality of HDD housings 200, which contain HDDS 210, are mounted to the motherboard and arranged on the front upper stage of the above housings 100. Two series of AC inputs are provided for the disk array device. In each housing 100, n units of AC/DC power supplies (1-1 to 1-n) 300*a* and n units of AC/DC power supplies (2-1 to 2-n) 300*b* are connected, in parallel, to each of the two AC inputs, respectively. These AC/DC power supplies 300*a*, 300*b* act as a power source, which supplies power to the loads such as the HDDs and various boards. A known power supply described in a publication (e.g., Transistor Gijutsu Special No. 28, 2nd Edition, Page 7, FIG. 1, CQ Publishing Co., Ltd.; Issued on Jan. 20, 1993) is employed as AC/DC power supplies 300*a* and 300*b*. A battery section 400 is mounted in each housing 100 to act as a UPS or backup power supply when the power supply from AC/DC power supplies 300*a* and 300*b* is shut off due, for instance, to a power failure. The battery section 400 consists of a secondary battery such as a lead battery. As the battery section, various alternative means can be used in place of a secondary battery as far as it is an auxiliary power supply means that functions as a UPS.

A controller for exercising overall control of the disk array device consists of a circuit board on which electronic components are mounted to implement its control functions. The mounted electronic components may include the following: a microprocessor; peripheral circuits such as a cache for storing the data to be written onto or read from a HDD 210, a RAM, and a ROM for storing a program that implements predetermined functions; and dedicated circuits and chips for implementing various functions. The functions of the controller may include: monitoring the states of the HDDs 210; exercising operational control (e.g., control according to RAID); and communication interfacing with a host computer.

When a main switch turns OFF or a power supply system fails, the controller performs a destaging process to write unwritten data remaining in the cache onto a HDD 210.

In addition, the motherboard carries interface control circuits 500A, 500B for communication interfacing with other HDDs 210, and a power supply control logic section (power supply control circuit) 600 for controlling the power supply system. The power supply control logic section 600 consists of a logic circuit.

Using DC power supply lines A and B, the outputs of the AC/DC power supplies 300*a* and 300*b* are consolidated (summed) separately into "group total outputs" for each of the two groups of AC inputs. More specifically, the outputs of n units of the AC/DC power supplies 300*a* are summed up into a first group total output (first total line output) for the first AC input using DC power supply line A, and the outputs of n units of the AC/DC power supplies 300*b* are summed up into a second group total output (second total line output) for the second AC input using DC power supply line B. The first and second total outputs supplied from these two DC power supply lines A and B (e.g., supply voltages of 30 V or 24 V) are ORed (wired-or, OR-circuit) via the motherboard, and entered in parallel to all loads in the disk array device as operation power. The loads may be power-consuming components such as the HDD housings 200 and controllers, including the interface control circuits 500A and 500B.

Each HDD housing 200 contains a step-down DC-DC converter 220 as a regulated DC power supply, which receives the first and second total outputs supplied from DC power supply lines A and B and supplies a predetermined supply voltage (e.g., 12 V or 5 V) to the HDD 210. In place of a step-down DC-DC converter, a well-known regulator may be used as the regulated DC power supply. For example, various power supplies, such as the power supply described in a publication (Transistor Gijutsu Special No. 28, 2nd Edition, Page 4, FIGS. 4, 5, and 6, CQ Publishing Co., Ltd.; Issued on Jan. 20, 1993) may be used as the regulated DC power supply. When a step-down DC-DC converter is used as the regulated DC power supply, the AC/DC power supply's output voltage can be set higher than the regulated DC power supply's output voltage. The interface control circuits 500A and 500B also have a DC-DC converter (marked "DC/DC" in FIG. 1) as a regulated DC power supply in order to supply a predetermined supply voltage using the first and second total outputs supplied from DC power supply lines A and B as an input.

In a DC-DC converter 220 in each HDD housing 200, a backflow prevention diode mounted on an upper stage in FIG. 1 (hereinafter referred to as the upper backflow prevention diode) and a backflow prevention diode mounted on a lower stage in FIG. 1 (hereinafter referred to as the lower backflow prevention diode) are interconnected by connecting their cathodes. The lower backflow prevention diode comprises a pair of backflow prevention diodes, which are connected in a series connection in forward direction. The cathode of the upper backflow prevention diode and the cathode of the lower backflow prevention diode are ORed (wired-or, OR-circuit) and connect to a constant voltage circuit section 220a in the DC-DC converter 220. In the present embodiment, the two backflow prevention diodes composing the lower backflow prevention diode and the single upper backflow prevention diode are the same electronic components having the same on-resistance (ON voltage). Therefore, the on-resistance setting for the upper backflow prevention diode can be lower than that for the lower backflow prevention diode. To provide such an on-resistance setup, the lower backflow prevention diode may consist of a single diode having a higher on-resistance than the upper backflow prevention diode.

As regards the odd-numbered HDDS 210 -shown in FIG. 1 when counting the HDDs from the top, its upper backflow prevention diode's anode is connected to DC power supply line A so that the first total line output can be supplied to the anode, and its lower backflow prevention diode's anode is connected to DC power supply line B so that the second total line output can be supplied to the anode. As regards the even-numbered HDDs 210 shown in FIG. 1, its upper backflow prevention diode's anode is connected to DC power supply line B so that the second total line output can be supplied to the anode, and its lower backflow prevention diode's anode is connected to DC power supply line A so that the first total line output can be supplied to the anode.

In a power supply system configured as above, during normal operation with no power supply failure encountered, either the first total line output or second total line output is supplied to each HDD 210 from the upper backflow prevention diode having a low on-resistance via the constant voltage circuit section 220a. If a power supply failure should arise causing the total line output from the upper backflow prevention diode having a low on-resistance to be lost, the total line output is delivered to the constant voltage circuit section 220a from the lower backflow prevention diode having a high on-resistance.

The controller's power supply control logic section 600 is connected via the motherboard wiring to the constant voltage circuit section 220a of each DC-DC converter 220 and the DC-DC converter (DC/DC) of each interface control circuit 500A, 500B, and sends a control signal to those components. The constant voltage circuit section 220a and DC-DC converter (DC/DC) start or stop operating in accordance with the control signal. For example, after completing a process to write data stored in the memory into a HDD 210 according to a write instruction received from an external host device, the power supply control logic section 600 outputs a control signal to stop the operation of the constant voltage circuit section 200a, which would otherwise output a supply voltage to the HDD 210 for which the write process has been completed.

Figure 2:
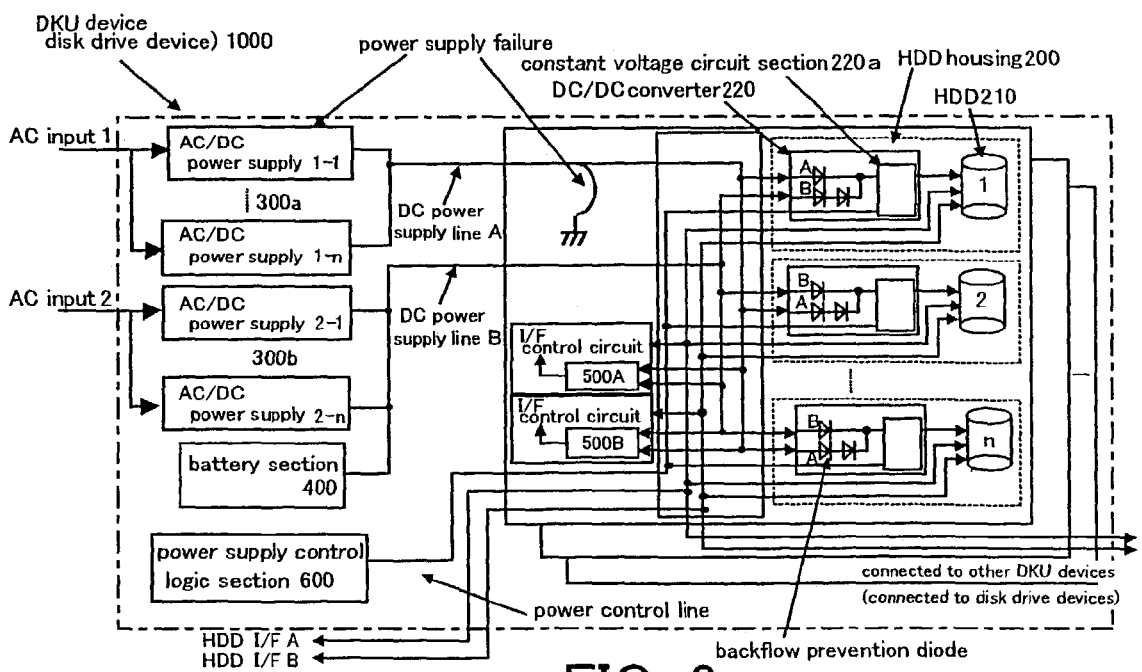
FIG. 2 is a block diagram that illustrates the event of shorting to ground on a motherboard according to one embodiment of the present invention.

A situation where a power supply failure arises due, for instance, to shorting to ground on the motherboard will now be described with reference to a block diagram shown in FIG. 2. If, as indicated in FIG. 2, the first total line output is lost as DC power supply line A is shorted to ground on the motherboard, the second total line output is supplied along DC power supply line B to make up for the loss. More specifically, if the shorted DC power supply line A is connected to the upper diode having a low on-resistance, when the first total line output is lost, the HDD 210, to which the first total line output had been supplied, will automatically switch to the second total line output supply scheme via DC power supply line B, which is connected to the lower diode having a high on-resistance. This ensures that the HDD 210 and other components can be accessed normally even in the event of shorting to ground on the motherboard.

The HDD interface control circuits 500A and 500B, which are loads provided on the motherboard, form a redundant circuit and receive operating power from a total line output via a DC-DC converter. Therefore, if, for example, any failure occurs in a HDD interface control circuit 500A, the DC-DC converter prevents the other components from being affected by the failure. Consequently, the remaining HDD interface control circuit 500B can continue to operate normally. As a result, since the HDDs 210 mounted to the motherboard remain accessible, no problem will arise in the disk array device.

Figure 3:
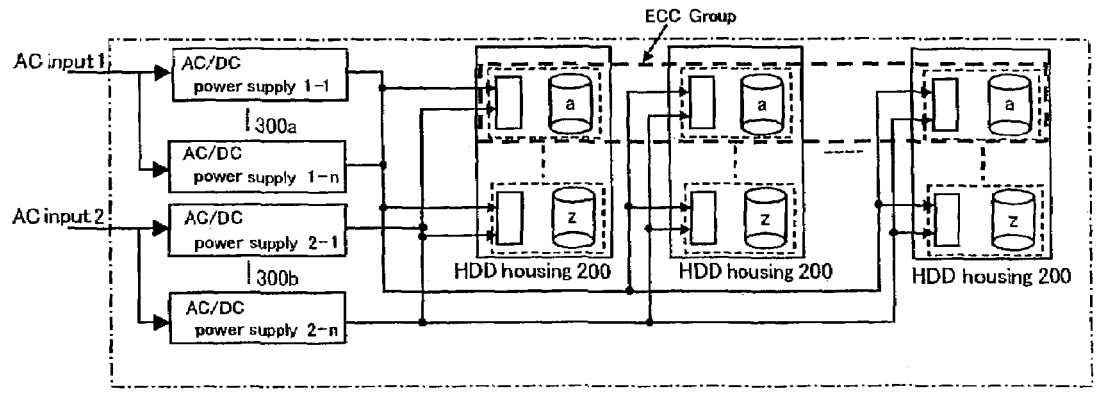
FIG. 3 is a block diagram that illustrates how one embodiment of the present invention confines an encountered failure within an error correction group.

Further, as shown in the block diagram in FIG. 3, even when a power supply failure arises due, for instance, to shorting on a certain HDD housing 200, the operating power provided by individual lines is supplied in parallel to all HDDs 210. Therefore, the failure is confined within the faulty HDD housing 200 and its error correction group (ECC group), which is shown surrounded by a thick broken line in the figure. Thus, the failure does not affect the entire disk array device.

As a result, the time required for data recovery subsequent to failure recovery will be about the same as the time required for recovering one HDD 210. This eliminates the need for using high-reliability parts that endure the period of data recovery for all the mounted HDDs 210.

Figure 14:
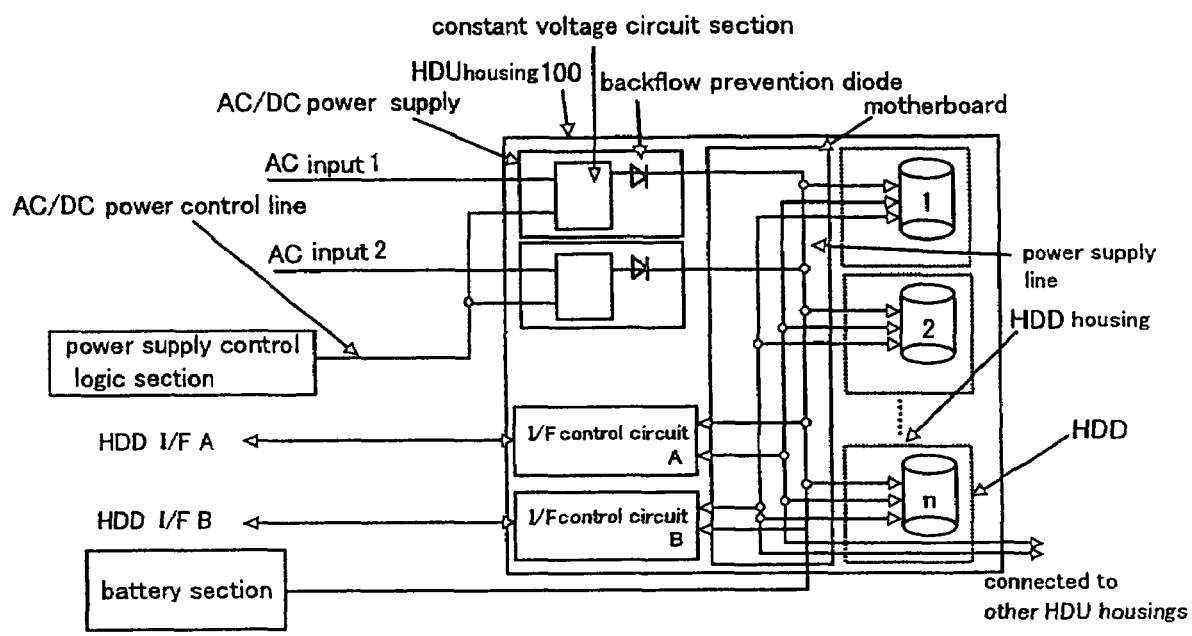
FIG. 14 is a block diagram illustrating a power supply scheme for a conventional disk array device.

When a conventional technique is used as shown in FIG. 14, power supply noise is generated by all of the n units of HDDs 210 along a long power supply path between the AC/DC power supplies 300a, 300b and the HDDs 210. The power supply noise is generated by a plurality of HDDs that share the same power supply. This power supply noise is generated due, for instance, to a ripple current caused by the operating state differences (for example, the difference in access states such as idle, seek, and read/write) among the HDDs, or a voltage drop caused by an impedance that the power supply path has.

Figure 4:
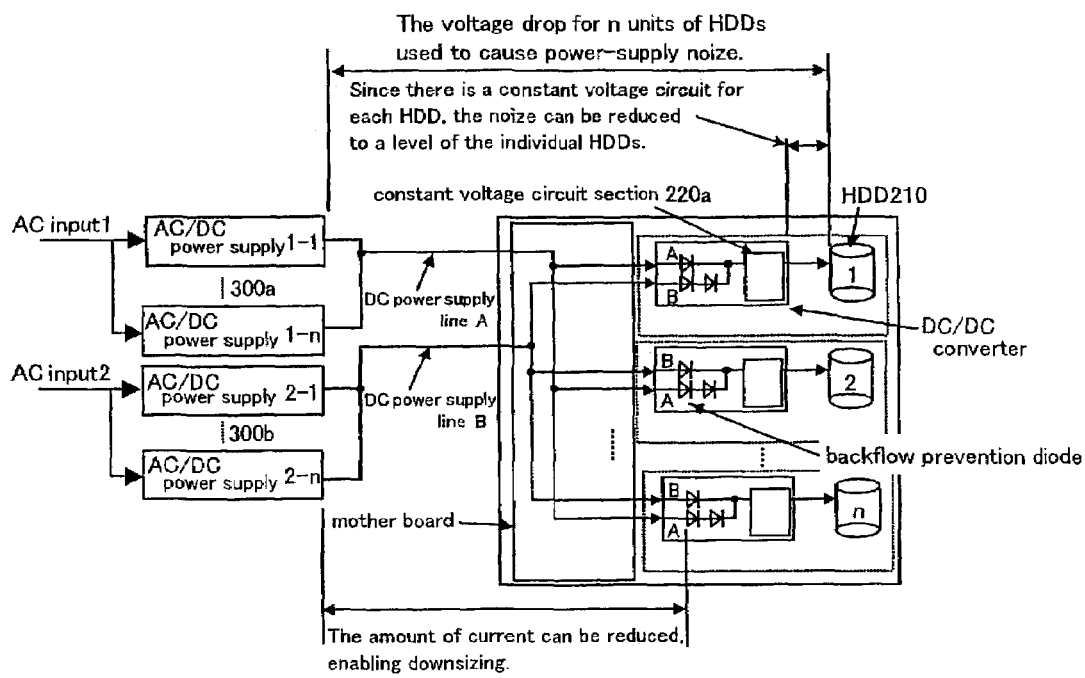
FIG. 4 is a block diagram that illustrates how one embodiment of the present invention reduces the current flow and voltage drop in a power feed path.

In the present embodiment, however, a DC-DC converter is provided as a power supply for the loads such as the HDD 210, and the DC-DC converter is connected to the power input terminal of the loads as shown in the block diagram of FIG. 4. Therefore, voltage drop and power supply noise generation occur only in the power supply paths within individual HDD housings 200. More specifically, voltage drop and power supply noise generation occur within a short power supply path between the constant voltage circuit section 220a and the HDD 210. As a result, the degree of voltage drop and power supply noise generation can be considerably reduced. Further, the DC-DC converter 220 can follow up on load variations so as to minimize the input voltage change resulting from the load variations.

Further, the output voltages of the AC/DC power supplies 300a, 300b are set at a value greater than the output voltage of the DC-DC converter 220. In this way, the current flow and voltage drop in a power supply path between the AC/DC power supplies 300a, 300b and the DC-DC converter can be reduced as shown in FIG. 4. Therefore, not only can the amount of noise generation from the power feed path be reduced, but low-power-consumption, small-size, inexpensive parts can be used for the power feed path.

Figure 5:
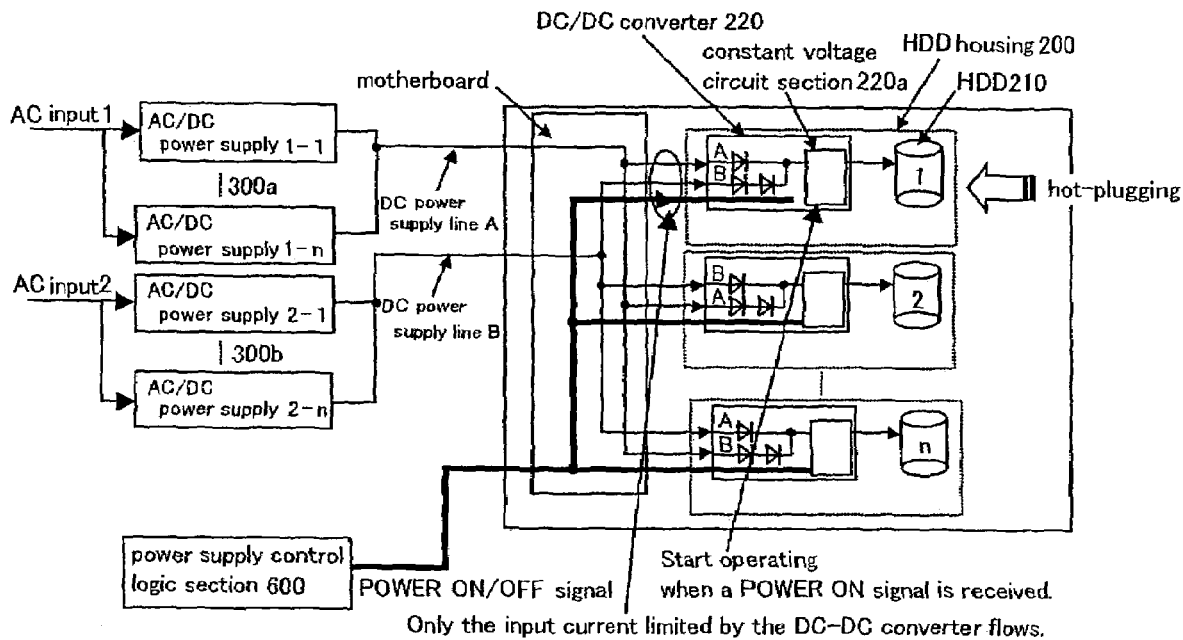
FIG. 5 is a block diagram that illustrates how one embodiment of the present invention hot-plugs a HDD housing.

As regards hot-plugging of a HDD housing 200 shown in FIG. 5, only after the HDD housing 200 is properly mounted to the motherboard, a control line for power supply instruction is connected from the power supply control logic section 600 to the DC-DC converter 220 to make the DC-DC converter 220 operate. In this way, the DC-DC converter 220 will not operate until a HDD housing 200 is properly mounted to the motherboard and the converter 220 receives a power supply instruction signal (POWER ON signal).

When the DC-DC converter 220 starts operating and oscillating, the output voltage linearly builds up. As a result, it looks as if the inrush current to a HDD 210 is inhibited. It can therefore be said that the DC-DC converter 220 has an inrush current protection function. Further, since only the input current limited by the DC-DC converter 220 flows from the AC/DC power supplies 300a, 300b to the DC-DC converter 220, it becomes possible to supply stabilized voltage to the other loads to which the same total line output is supplied, and it is not necessary to furnish a dedicated circuit for inrush current protection.

Figure 6:
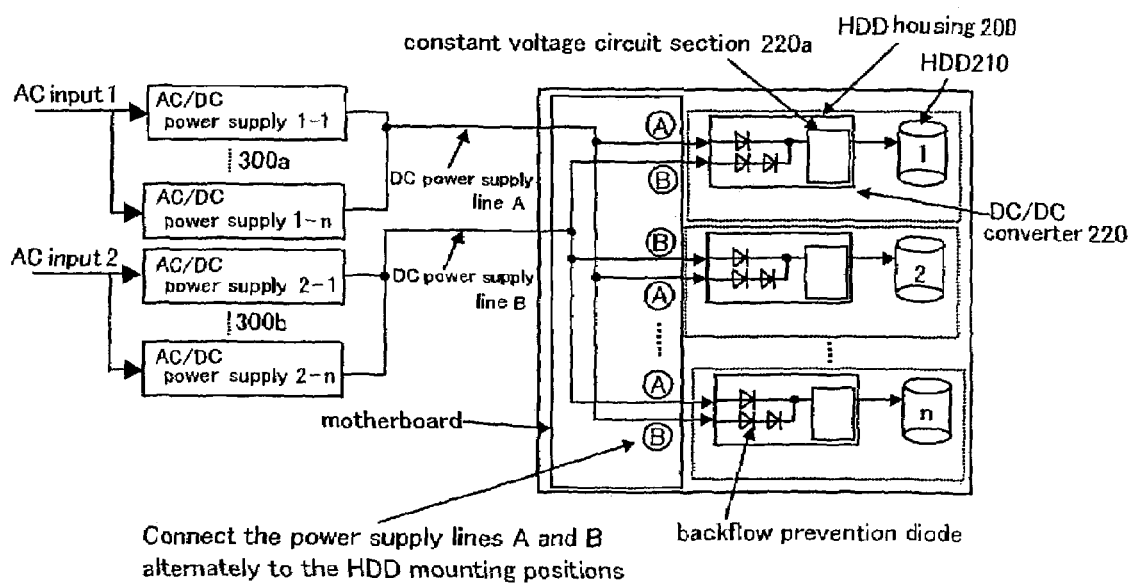
FIG. 6 is a block diagram that exemplifies a connection for equal power distribution according to one embodiment of the present invention.

As regards the odd-numbered HDD 210 shown in FIG. 6 when counting the HDDs from the top, the anode on the upper backflow prevention diode having a low on-resistance is connected to DC power supply line A so that the first total line output can be supplied to the anode, and the anode on the lower backflow prevention diode having a high on-resistance is connected to DC power supply line B so that the second total line output can be supplied to the anode. As regards the even-numbered HDD 210 when counting the HDDs from the top, the anode on the upper backflow prevention diode having a low on-resistance is connected to DC power supply line B so that the second total line output can be supplied to the anode, and the anode on the lower backflow prevention diode having a high on-resistance is connected to DC power supply line A so that the first total line output can be supplied to the anode.

In other words, the number of DC-DC converters 220 provided with the backflow prevention diode having a low on-resistance connected to the first total line output is equal to the number of DC-DC converters 220 provided with the backflow prevention diode having a low on-resistance connected to the second total line output. The expression, "the numbers of DC-DC converters 220 are equal," has the following meaning: when an even number of HDDs 210 exist within the housing, the number can be divided by two, which is the number of groups (lines), and the number is the same; and, when an odd number of HDDs 210 exist within the housing, the difference in the number is 1. Therefore, during normal operation with no power supply failure encountered, it means that the numbers of DC-DC converters 220 are exactly equal or substantially equal as far as the first total line output and the second total line output supplied to the DC-DC converters 220 are equally distributed. The expression, "equally distributed," can also mean that the AC input to be the source for the first total line output and the AC input to be the source for the second total line output are equally distributed in terms of electricity.

The configuration of connecting the DC power supply lines A and B to the upper and lower backflow prevention diodes to ensure that the first and second total line outputs supplied to the DC-DC converters 220 are equally distributed is not limited to that of the present embodiment; various other designs can also be adopted.

Figure 7:
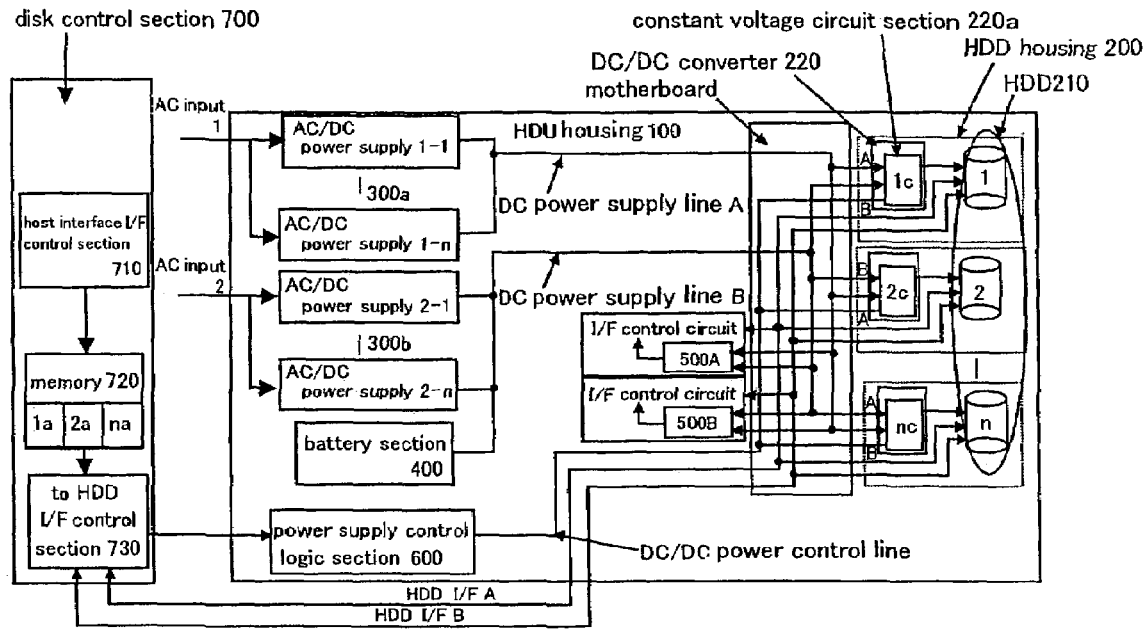
FIG. 7 is a block diagram illustrating control that is exercised individually by the output operations of DC-DC converters according to one embodiment of the present invention.

As shown in FIG. 7, a controller (disk control section in the figure) 700 comprises a host interface control section 710, a memory 720, and a HDD interface control section 730. According to a state in which data is being written into the HDDs 210, the controller 700 sends, to the power supply control logic section 600 via the HDD interface control section 730, a signal for controlling the operation of each of the DC-DC converters 220. In accordance with the received signal, the power supply control logic section 600 transmits an ON or OFF control signal to the constant voltage circuit sections 220a of each of the DC-DC converters 220.

As a result, the output operations of the DC-DC converters 220 are individually controlled so as to exercise power feed control over the HDDs 210 on an individual basis. In addition, stable output voltage supply can be provided by the DC-DC converters that are furnished individually for each HDD 210. Therefore, when each load, such as the HDD 210, does not have to be operated, the output of a DC-DC converter 220 can be shut off as appropriate with a control signal.

In estimating the capacity of the battery section 400, which acts as an auxiliary power supply, conventionally, a large capacity used to be required for assuring the operations of all the HDDs within the housing during, for instance, destaging. However, the present invention makes it possible to individually shut off the power supply output to loads that need not operate.

Data assurance in the event of a failure will now be described. When a power supply system failure occurred on a motherboard or the like, the failure conventionally affected the entire housing. It was therefore not possible to copy/transfer data to a spare disk. However, in the present invention, a power monitoring section 210b of each HDD 210 monitors the power supply status and reports it to the controller (disk control section ) 700 as described earlier and as shown in FIG. 8. In accordance with the reported power supply status, the controller 700 saves data or takes some other failure recovery action. Therefore, even if a DC-DC converter failure occurs, only the associated HDD will fail and all the other components remain intact. It is therefore possible to save data on a spare disk.

Figure 8:
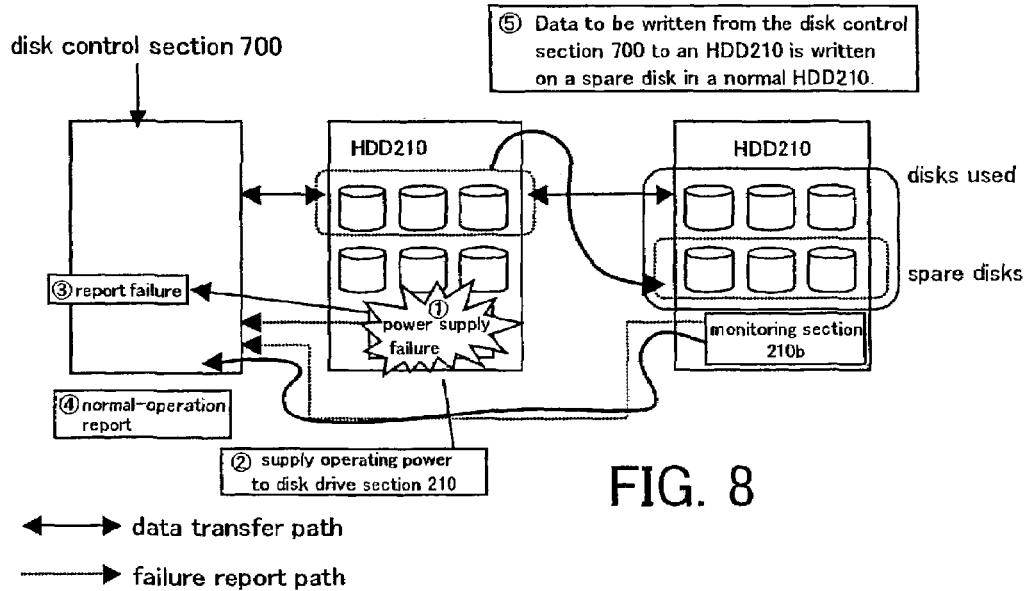
FIG. 8 is a block diagram that illustrates how one embodiment of the present invention saves data on a spare disk.

The operation will now be described in detail with reference to FIGS. 7 and 8. When a power supply failure is detected by the power monitoring section 210b of a HDD 210 ((1) in FIG. 8), means such as the total line output is used to supply operating power to various sections ((2) in FIG. 8) as described earlier. At the same time, the power monitoring section 210b of the HDD 210 reports the result of monitoring to the disk control section 700 ((3) in FIG. 8). If the data for the failed HDD 210 has already been written into the memory 720 of the disk control section 700 when the disk control section 70 receives a power supply failure report from the power monitoring section 210b of the HDD 210, the disk control section 700 reads the data from the memory 720 and writes it on a spare disk in some other normal HDD 210 ((5) in FIG. 8). The disk control section 700 then operates using the spare disk in the normal HDD 210 until the power supply failure is recovered. The other normal HDD 210 that has not failed informs the disk control section 700 that it is operating normally ((4) in FIG. 8).

Figure 9:
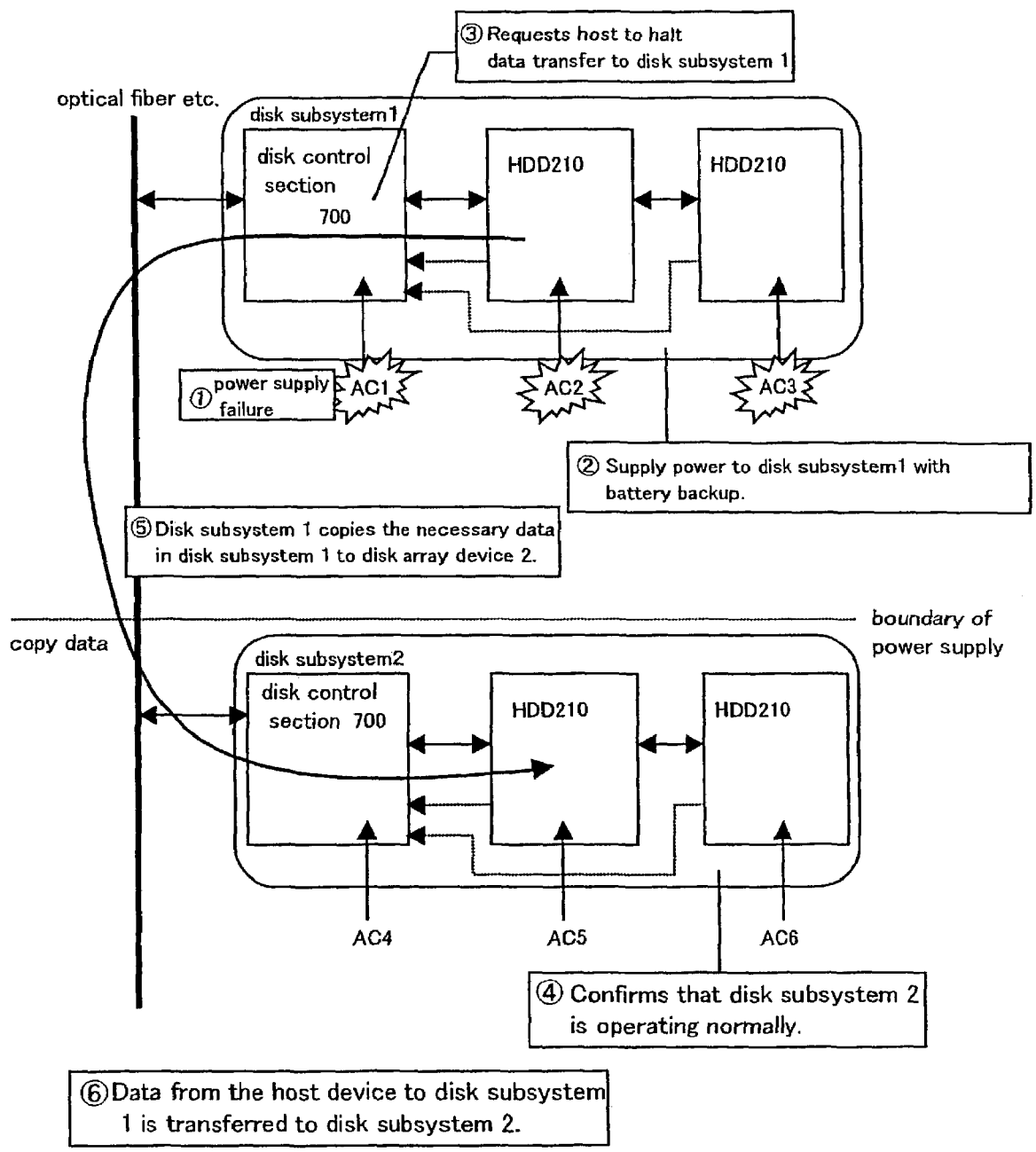
FIG. 9 is a block diagram that illustrates how one embodiment of the present invention copies a data backup to a disk array device.

A situation where a disk array device (disk subsystem in FIG. 9) containing a faulty HDD 210 is the copy destination for data backup (including remote copying) will now be described with reference to FIG. 9. Conventionally, when a power supply failure occurs on a motherboard or the like, the request for data backup could not be accepted because the failure would affect the entire housing. However, according to the present invention, it is possible to keep the disk array device in a normal state as a whole because the failure in a certain HDD 210 is merely a partial failure, as described earlier. In the present invention, therefore, a data backup can be copied to a normally operating HDD 210.

The operation will now be described in detail with reference to FIGS. 7 and 9. When a power supply failure is detected by the power monitoring section 210b of a HDD 210 ((1) in FIG. 9), means such as the total line output is used to supply operating power to various sections ((2) in FIG. 9) as described earlier. At the same time, the power monitoring section 210b of the HDD 210 reports the result of monitoring to the disk control section 700. In the disk array device ("disk subsystem" in the figure) 1, upon receipt of a power supply failure report from the power monitoring section 210b of the HDD 210, the disk control section 700 sends a request to a host device to halt data transfer and to change the destination of data read/data write process from disk array device 1 to disk array device 2 (disk subsystem 2 in the figure) ((3) in FIG. 9). The disk control section 700 in disk array device 1 confirms that disk array device 2 is operating normally ((4) in FIG. 9). After confirmation, the disk control section 700 in disk array device 1 copies the necessary data in disk array device 1 to disk array device 2, which is operating normally ((5) in FIG. 9). The host device then changes the destination of the data read/data write process from disk array device 1 to disk array device 2 ((6) in FIG. 9).

Figure 10:
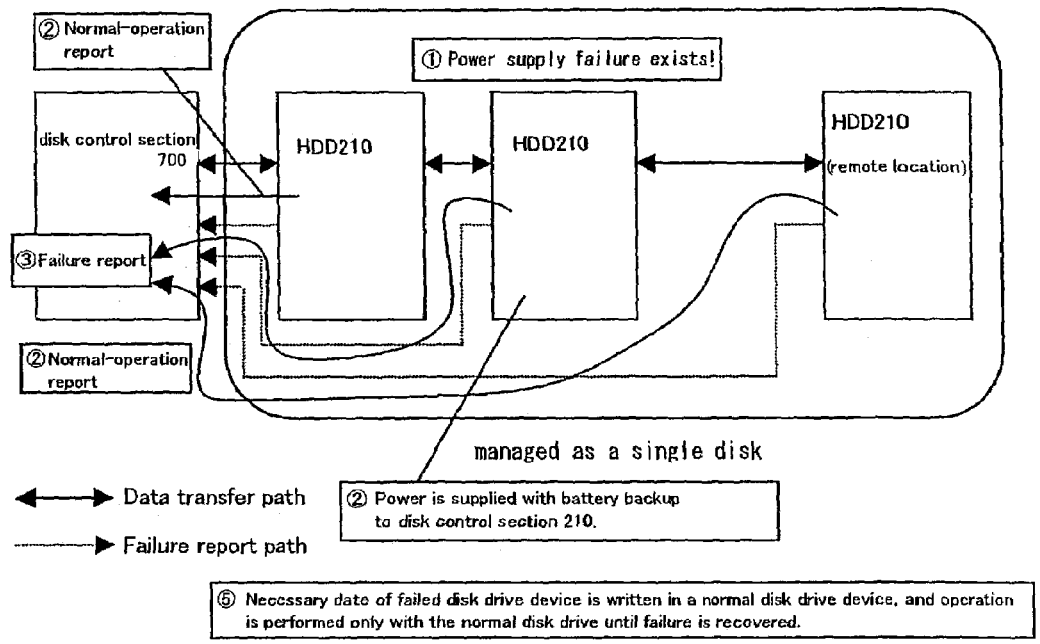
FIG. 10 is a block diagram illustrating a case where a disk array device according to one embodiment of the present invention is used for virtualization.

The block diagram in FIG. 10 shows a case where the present invention is used for disk array device virtualization. In the figure, it is assumed that a plurality of HDDs 210, including HDDs 210 at a remote site, are managed and operated as a single disk. Even when a failure occurs in a certain HDD 210 in such a situation, according to the present invention, it is merely a partial failure as described above. Therefore, it is possible to keep the disk array device in a normal state as a whole. According to the present invention, even when such a partial failure occurs, it is possible to use a normally operating HDD 210 to perform a data read/data write process.

The operation will now be described in detail with reference to FIGS. 7 and 10. When a power supply failure is detected by the power monitoring section 210b of a HDD 210 ((1) in FIG. 10), means such as the total line output is used to supply operating power to various sections ((2) in FIG. 10) as described earlier. At the same time, the power monitoring section 210b of the HDD 210 reports the result of monitoring to the disk control section 700 ((3) in FIG. 10). If the data for the failed HDD 210 has already been written into the memory 720 of the disk control section 700 when the disk control section 70 receives a power supply failure report from the power monitoring section 210b of the HDD 210, the disk control section 700 reads the data from the memory 720 and writes it on a spare disk in some other normal HDD 210 ((5) in FIG. 10). The disk control section 700 then operates using the normal HDD 210 until the power supply failure is recovered. The other normal HDDs 210 (including those at remote sites) that have not failed inform the disk control section 700 that they are operating normally ((4) in FIG. 10).

Figure 11:
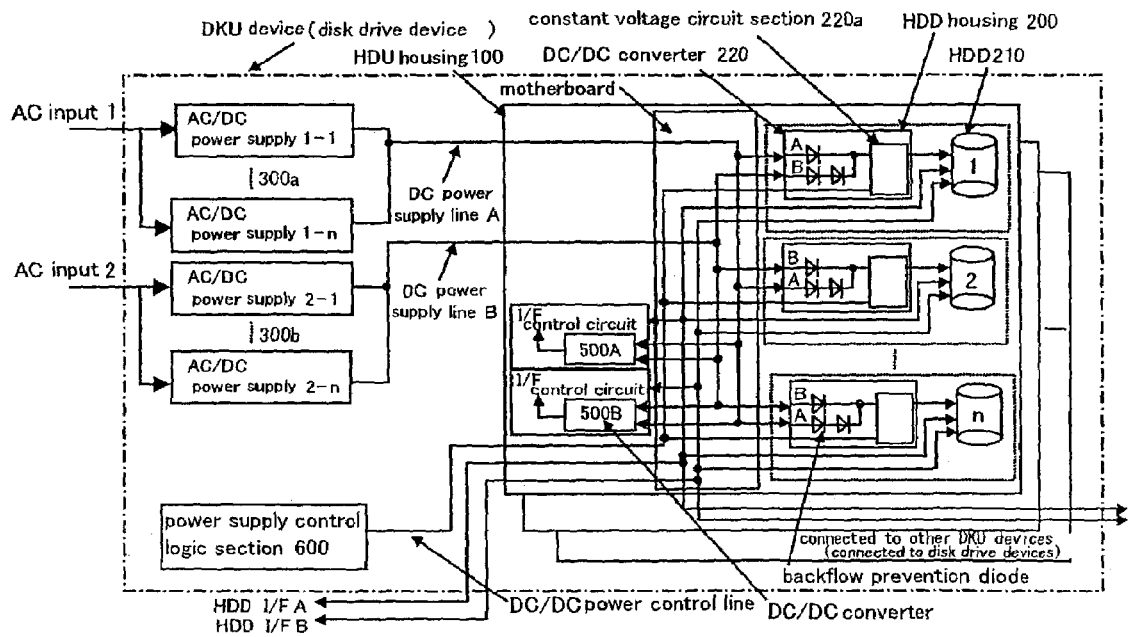
FIG. 11 is a block diagram illustrating a modified version of one embodiment of the present invention.

A modified version of the present embodiment will now be described with reference to FIG. 11. Although the modified version does not have the battery section 400, the present invention can be implemented because a duplex AC input is provided in a redundant manner as a power supply system. Either one of the two AC inputs performs the auxiliary power supply function of the battery section 400.

Figure 12:
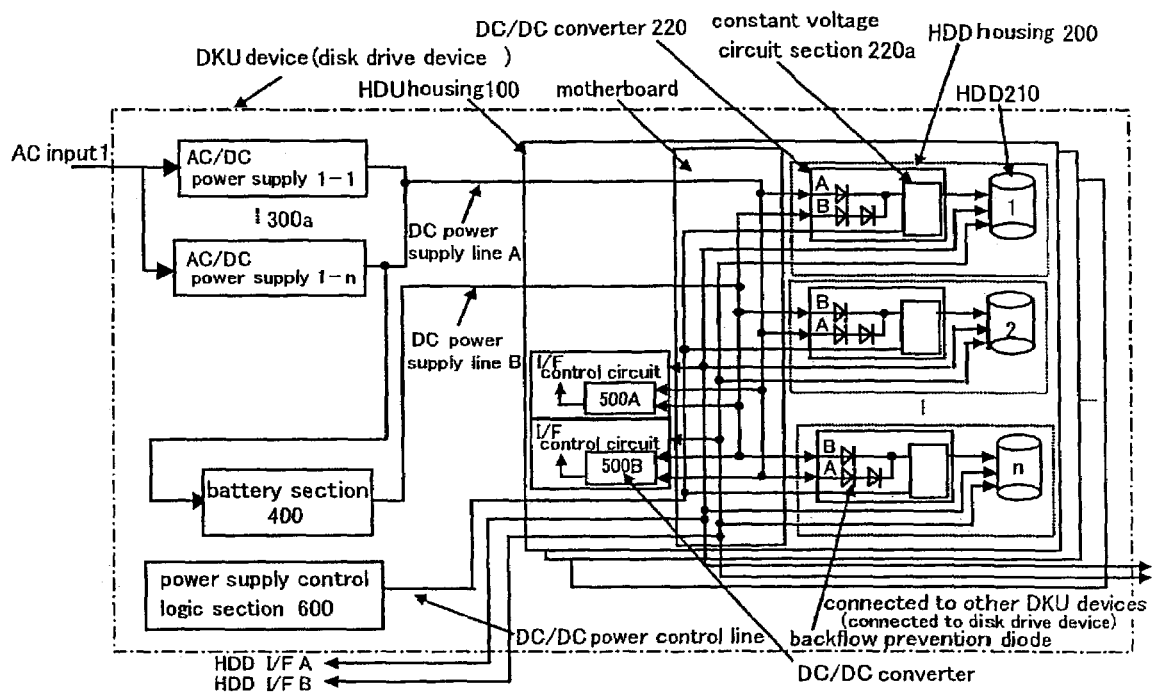
FIG. 12 is a block diagram illustrating another embodiment of the present invention.
Figure 13:
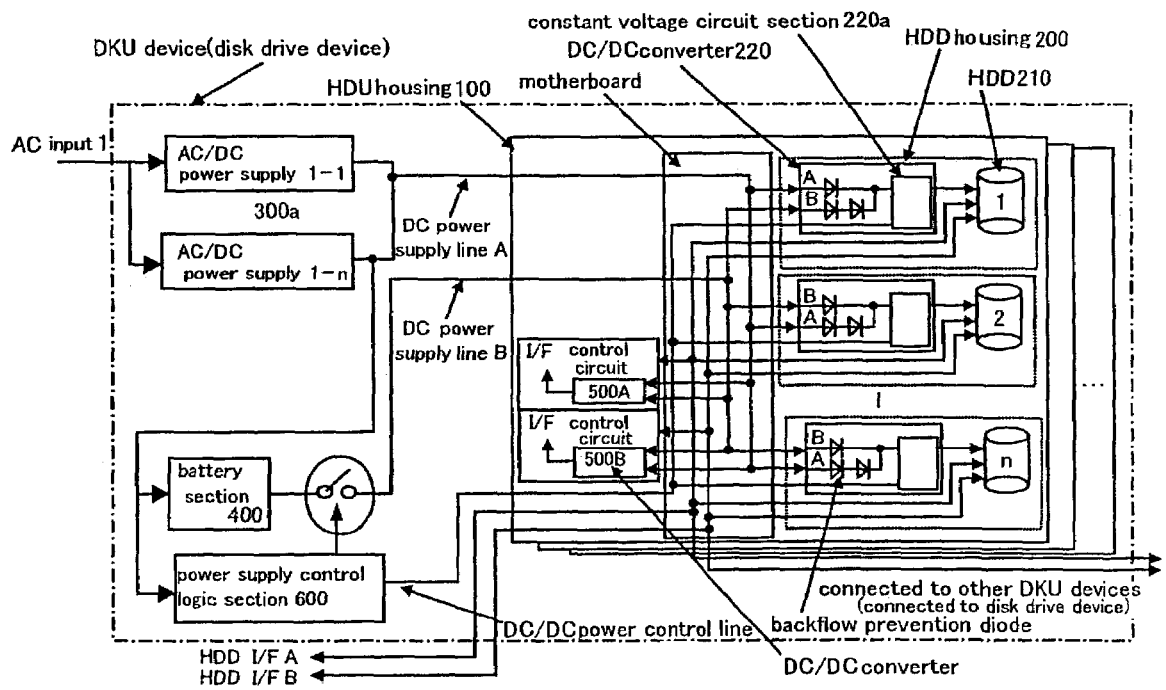
FIG. 13 is a block diagram illustrating a modified version of another embodiment of the present invention.

Another embodiment of the present invention will now be described with reference to FIG. 12. In this embodiment, only one series (group) of AC input is provided instead of the duplex AC input, and the total output of the AC/DC power supplies 300a is connected to the battery section 400. The output of this battery section is supplied to DC power supply line B and used as another total output. FIG. 13 shows a modified version of the embodiment shown in FIG. 12.

In the modified version, the total output of the AC/DC power supplies 300a is delivered to both the battery section 400 and power supply control logic section 600. In addition, a switching device is provided in DC power supply line B, which is connected to the battery section 400. This switching device includes a power MOS FET and is subjected to ON/OFF control by the power supply control logic section 600. The power supply control logic section 600 monitors the total output status; the logic section 600 makes the switching device turn ON only when the output of the battery section 400 is required, and otherwise, the switching device is kept OFF.

While the present invention has been described in terms of embodiments, it should be understood that the invention is not limited to those embodiments and that variations may be made without departure from the scope and spirit of the invention.

Some of the advantages offered by the embodiments of the present invention will now be described.

A plurality of total line outputs are used as operating power for each load within a disk array device. Therefore, even if a certain total line output is lost due, for instance, to a failure, another total output is supplied, as operating power, to all loads within a disk array device. The disk array device operation is therefore kept normal.

Even if a short circuit or other power supply failure occurs in the load such as the HDD, the failure is confined within the load in which the failure exists because operating power is supplied independently for each line (group). As a result, the fault does not affect the entire disk array device.

Further, the fault can be confined within a single failed HDD. Therefore, the time required for data recovery subsequent to failure recovery is no more than the time required for the recovery of one HDD. This eliminates the need for using high-reliability parts that endure the period of data recovery for all the mounted HDDs.

The HDD interface control circuitry, which is a load mounted on the motherboard, is duplexed and receives operating power from total line outputs via DC-DC converters. Therefore, even if a failure occurs in one HDD interface control circuit, the DC-DC converter prevents the failure from spreading, thereby ensuring the normal operation of the remaining HDD interface control circuit. As a result, no problem arises in accessing the HDDs mounted on the motherboard; therefore, there is no problem in the disk array device as a whole.

A circuit board, on which HDDs, HDD interface control circuits, and other components are mounted as loads to which operating power should be supplied, has a DC-DC converter, which is to be connected to the power input terminals of these loads. It is therefore possible to minimize the wiring distance between the power input terminals and DC-DC converter, thereby considerably reducing voltage drop and noise generation. The DC-DC converter can also follow up on load variation for each load, thereby minimizing the input voltage variation arising out of such load variation.

Conventionally, when a power supply system failure occurred on, for example, a motherboard, data could not be saved onto a spare disk because the failure affected the entire housing. In one embodiment of the present invention, however, a failure occurring in the DC-DC converter is confined within the associate HDD so that no other components are affected. Therefore, data can be saved onto a spare disk.

The control line for instructing power supply is connected to the DC-DC converter to make the DC-DC converter operative only after the HDD housing is properly mounted to the motherboard. Therefore, the DC-DC converter does not operate until the HDD housing properly is mounted to the motherboard and a power supply instruction signal is received.

When the DC-DC converter starts operating and oscillating, the output voltage linearly builds up. As a result, it looks as if the inrush current to a HDD is inhibited. It can therefore be said that the DC-DC converter has an inrush current protection function. Further, since only the input current limited by the DC-DC converter flows from the AC/DC power supplies to the DC-DC converter, it becomes possible to supply stabilized voltage to the other loads to which the same total line output is supplied, and it is not necessary to furnish a dedicated circuit for inrush current protection.

The output voltages of the AC/DC power supplies are set at a value greater than the regulated DC power supply's output voltage. In this way, the current flow and voltage drop in a power feed path between the AC/DC power supplies and DC-DC converter can be reduced. Therefore, not only can the amount of noise generation from the power feed path be reduced, but low-power-consumption, small-size, inexpensive parts can be used for the power feed path.

As the inputs for the regulated DC power supplies, two lines (groups) of outputs, i.e., the first and second total line outputs, are used. When the first and second total line outputs are normal, the total line output connected to the backflow prevention diode having a low on-resistance is used as the regulated DC power supply's input.

The system is configured so that a number of DC stabilized power supplies provided with the backflow prevention diode having a low on-resistance connected to the first total line output and a number of DC stabilized power supplies provided with the backflow prevention diode having a low on-resistance connected to the second total line output are substantially the same. This ensures that the first and second total line outputs to be supplied to all regulated DC power supplies are equally distributed.

When the AC/DC power supply outputs are substantially equalized in this manner, the input current for the AC/DC power supplies is about half (½) the total current consumption during a normal operation. As a result, the amount of high-frequency noise generation from the AC/DC power supplies can be decreased.

The output operations of the regulated DC power supplies provided for various loads, such as the HDDs, are individually controlled. More specifically, power feed control can be exercised individually for all HDDS, and stable output voltage supply can be provided by the regulated DC power supplies that are furnished individually for the HDDs. Therefore, when a load, such as a HDD, does not have to be operated, the output of a regulated DC power supply can be shut off as appropriate with a control signal.

Therefore, in estimating the capacity of the battery section, which acts as an auxiliary power supply, conventionally, a large capacity used to be required for assuring the operations of all the HDDs within the housing during, for instance, destaging. However, the present invention makes it possible to individually shut off the power supply output to loads that need not operate.

As a result, not only can the battery section capacity be rendered smaller-than before, but flexibility in setting can be increased. Therefore, the size, weight, and price of the disk array device can be reduced.

For example, in case a power supply fails, after finishing a destaging process using the power supply from the battery section, the operation of each regulated DC power supply that is provided for outputting a supply voltage to the disk drive(s) for which the write process has been finished is stopped. This reduces the battery section's power consumption for the destaging process.

The present invention can enhance the reliability of disk array devices.

What is claimed is:

1. A storage system, comprising:
a plurality of disk drive units having a plurality of disk drives which have a plurality of storage regions;
a controller which transfers data to said storage regions;
at least one data line being used to relay data transferred from said controller;
at least one first AC/DC power supply being inputted AC input and supplying a first portion of said disk drive units with DC power;
at least one first power line being used to relay DC power from said at least one first AC/DC power supply to said first portion;
a first DC power supply coupled to said at least one first power line via a first backflow prevention device and corresponding to said first portion and supplying said first portion with DC power which is less than inputted DC power;
at least one second AC/DC power supply being inputted AC input and supplying a second portion of said disk drive units with DC power;
at least one second power line being used to relay DC power from said at least one second AC/DC power supply to said second portion; and
a second DC power supply coupled to said at least one second power line via a second backflow prevention device and corresponding to said second portion and supplying said second portion with DC power which is less than inputted DC power;
wherein said first DC power supply is coupled to said at least one second power line via a third backflow prevention device,
wherein said second DC power supply is coupled to said at least one first power line via a fourth backflow prevention device,
wherein voltage of said first backflow prevention device is corresponding to voltage of said second backflow prevention device, and
wherein voltage of said third backflow prevention device is corresponding to voltage of said fourth backflow prevention device.

2. A storage system according to claim 1, wherein:
said first DC power supply is a DC-DC converter, and
said second DC power supply is a DC-DC converter.

3. A storage system according to claim 1, wherein:
said first DC power supply has a circuit for making constant voltage between said first backflow prevention device and said first portion, and
said second DC power supply has a circuit for making constant voltage between said second backflow prevention device and said second portion.

4. A storage system according to claim 1, comprising:
a plurality of said first AC/DC power supplies, and
a plurality of said second AC/DC power supplies.

5. A storage system according to claim 1, wherein:
said first portion is a disk drive unit of said disk drive units.

6. A storage system according to claim 1, wherein:
said first backflow prevention device is a backflow prevention diode,
said second backflow prevention device is a backflow prevention diode,
said third backflow prevention device is a backflow prevention diode, and
said fourth backflow prevention device is a backflow prevention diode.

7. A storage system according to claim 1, wherein:
said first backflow prevention device comprises at least one backflow prevention diode,
said second backflow prevention device comprises at least one backflow prevention diode, and
the number of said at least one backflow prevention diode of said first backflow prevention device is less than the number of said at least one backflow prevention diode of said third backflow prevention device.

8. A storage system according to claim 1, wherein:
the voltage of said first backflow prevention device is less than the voltage of said third backflow prevention device.

9. A storage system according to claim 1, wherein:
said first DC power supply supplies DC power supplied from said at least one first AC/DC power supply to said first portion, if a part related to said at least one first AC/DC power supply or said at least one first power line does not have a failure,
said second DC power supply supplies DC power supplied from said at least one second AC/DC power supply to said second portion, if a part related to said at least one first AC/DC power supply or said at least one first power line does not have a failure, and
said first DC power supply supplies DC power supplied from said at least one second AC/DC power supply to said first portion, if a part related to said at least one first AC/DC power supply or said at least one first power line has a failure.

10. A storage system according to claim 1,
wherein said first backflow prevention device is same construction of said fourth backflow prevention device and differs from said second backflow prevention device, and
wherein said second backflow prevention device is same construction of said third backflow prevention device.

11. A storage system according to claim 1,
wherein said first DC power supply supplies DC power supplied from said at least one first AC/DC power supply to said first portion, if a part related to said at least one first AC/DC power supply or said at least one first power line does not have a failure,
wherein said second DC power supply supplies DC power supplied from said at least one second AC/DC power supply to said second portion, if a part related to said at least one first AC/DC power supply or said at least one first power line does not have a failure, and
wherein said first DC power supply supplies DC power supplied from said at least one second AC/DC power supply to said first portion, if a part related to said at least one first AC/DC power supply or said at least one first power line has a failure.

12. A storage system according to claim 1,
wherein voltage of said first backflow prevention device is substantially equal to voltage of said fourth backflow prevention device and is different from voltage of said third backflow prevention device, and
wherein voltage of said second backflow prevention device is substantially equal to voltage of said third backflow prevention device and is different from voltage of said fourth backflow prevention device.

13. A storage system according to claim 12, further comprising:
at least one interface control circuit coupled to said at least one data line and configured to transfer data to be written to said disk drive units;
wherein at least one of said loads comprises said at least one interface control circuits.

14. A storage system according to claim 12, wherein:
said at least one of said loads comprises said controllers.

15. A storage system according to claim 1,
wherein said first DC power supply supplies said first portion with DC power which is supplied from said at least one first AC/DC power supply via said at least one first power line, if said at least one first power line does not have a failure,
wherein said first DC power supply supplies said first portion with DC power which is supplied from said at least one second AC/DC power supply via said at least one second power line, if said at least one first power line has a failure,
wherein said second DC power supply supplies said second portion with DC power which is supplied from said at least one second AC/DC power supply via said at least one second power line if said at least one second power line does not have a failure, and
wherein said second DC power supply supplies said second portion with DC power which is supplied from said at least one first AC/DC power supply via said at least one first power line if said at least one second power line has a failure.

16. A storage system, comprising:
a plurality of disk drive units coupled to said at least one data line and having a plurality of disk drives which have a plurality of storage regions;
a controller which transfers data to said storage regions;
at least one data line being used to relay data transferred from said controller;
at least one first AC/DC power supply being inputted AC input and supplying a first disk drive unit of said disk drive units with DC power;
at least one first power line being used to relay DC power from said at least one first AC/DC power supply to said first disk drive unit;
a first DC power supply coupled to said at least one first power line via a first backflow prevention device and corresponding to said first disk drive unit and supplying said first disk drive unit with DC power which is less than inputted DC power;
at least one second AC/DC power supply being inputted AC input and supplying a second disk drive unit of said disk drive units with DC power;
at least one second power line being used to relay DC power from said at least one second AC/DC power supply to said second disk drive unit; and
a second DC power supply coupled to said at least one second power line via a second backflow prevention device and corresponding to said second disk drive unit and supplying said second disk drive unit with DC power which is less than inputted DC power;

wherein said at least one first power line is coupled to said second DC power supply via a third backflow prevention device;

wherein said at least one second power line is coupled to said first DC power supply via a fourth backflow prevention device;

wherein voltage of said first backflow prevention device is substantially equal to voltage of said second backflow prevention device and is different from voltage of said fourth backflow prevention device, and wherein voltage of said third backflow prevention device is substantially equal to voltage of said fourth backflow prevention device and is different from voltage of said first backflow prevention device.

* * * * *